US008831251B2

(12) United States Patent
Oh

(10) Patent No.: US 8,831,251 B2

(45) Date of Patent: Sep. 9, 2014

(54) APPARATUS AND METHOD OF CONTROLLING DRIVING OF POPUP TWEETER SPEAKER

(75) Inventor: Se Min Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 479 days.

(21) Appl. No.: 13/172,595

(22) Filed: Jun. 29, 2011

(65) Prior Publication Data

US 2012/0134515 A1 May 31, 2012

(30) Foreign Application Priority Data

Nov. 30, 2010 (KR) ........................ 10-2010-0120944
May 31, 2011 (KR) ........................ 10-2011-0052371

(51) Int. Cl.
*H02B 1/00* (2006.01)
*H04R 1/02* (2006.01)
*H04R 3/00* (2006.01)

(52) U.S. Cl.
CPC ............ *H04R 1/026* (2013.01); *H04R 2499/13* (2013.01); *H04R 3/007* (2013.01)
USPC ........................................... 381/123; 381/333

(58) Field of Classification Search
USPC ........................................... 381/123, 87, 387
See application file for complete search history.

(56) References Cited

U.S. PATENT DOCUMENTS

2005/0091739 A1* 5/2005 Lerma ............................ 4/541.1
2007/0140508 A1* 6/2007 Soerensen ........................ 381/87
2007/0169259 A1* 7/2007 Macey et al. .................. 4/541.1
2008/0095395 A1* 4/2008 Pieklik et al. ................. 381/387
2008/0199037 A1* 8/2008 Xu et al. ....................... 381/387
2009/0040037 A1* 2/2009 Schraga ......................... 340/459
2009/0177327 A1* 7/2009 Turner et al. .................. 700/275

FOREIGN PATENT DOCUMENTS

EP 2181895 A2 5/2010
JP 2001-112080 A 4/2001
JP 2006-106139 A 4/2006
KR U1998-052458 10/1998
KR 10-1999-0043450 A 6/1999
KR 100350877 8/2002
KR 10-2005-0007730 A 1/2005
KR 10-1083715 B1 11/2011

* cited by examiner

*Primary Examiner* — Duc Nguyen
*Assistant Examiner* — Phan Le
(74) *Attorney, Agent, or Firm* — Edwards Wildman Palmer LLP; Peter F. Corless

(57) ABSTRACT

A method of controlling driving of the pop-up tweeter speaker which includes (a) determining whether or not an opening of the tweeter speaker is normally completed and popping-down the tweeter speaker if it is determined that the opening is not normally completed, while popping-up the tweeter speaker based on a speaker control condition under an ON condition of an accessory (ACC) condition, (b) determining whether or not a close of the tweeter speaker is normally completed and popping-up the tweeter speaker if it is determined that the close is not normally completed, while popping-down the tweeter speaker based on an OFF condition of one of the speaker control condition and the ACC condition, and (c) maintaining a position state of the tweeter speaker until the speaker control condition or the ACC condition becomes an OFF condition when popping-down the tweeter speaker in (a) or popping-up the tweeter speaker in (b).

10 Claims, 2 Drawing Sheets

APPARATUS AND METHOD OF CONTROLLING DRIVING OF POPUP TWEETER SPEAKER

CROSS-REFERENCES TO RELATED APPLICATIONS

The priority of Korean patent application Nos. 10-2010-120944 filed on Nov. 30, 2010, and 10-2011-52371 filed on May 31, 2011, the disclosure of which is hereby incorporated in its entirety by reference, is claimed.

BACKGROUND OF THE INVENTION

1. Field of the Invention

The present invention relates to an apparatus and method of controlling driving of a pop-up tweeter speaker, and more particularly, to an apparatus and method of controlling driving of a pop-up tweeter speaker, taking an abnormal state into consideration in pop-up or pop-down registration of a pop-up tweeter, that is, in which a pop-up or pop-down operation is not completed within a predetermined period of time, or a motor for providing power to a transfer unit of a tweeter speaker is overloaded.

2. Description of the Related Art

In general, audio systems are now typically installed in vehicles for listening to the radio or music as a standard feature. These audio systems typically includes an antenna, a media source (a radio tuner, a cassette, a compact disc (CD) or the like), a sound wave compensation unit, an audio frequency amplification unit, a speaker or the like.

Speakers are an essential element of the audio system which are for the most part primarily responsible for the acoustic quality in the vehicle. More specifically, a subwoofer speaker which is in charge of the sound field at a low and medium band and a tweeter speaker which is in charge of a sound field of a high band have are typically used.

The tweeter speaker described above, outputs sound of a high band having a short wavelength and high directivity so that sound quality characteristics of an audio system are considerably changed according to an output direction of the sound. Such a tweeter speaker is often installed in a fixed manner so as to provide consistent sound in a desired direction. However, the tweeter speakers may also be installed in a vehicle with a pop-up module in a manner in which the tweeter speaker pops-up when an accessory on (ACC) power is turned on and pops-down when the ACC power is turned off.

However, in the pop-up tweeter speaker, when the tweeter speaker is popped-up or popped-down, an ascending/descending operation of the tweeter speaker may be interrupted by foreign substances in which have fallen into or have been inserted into the mechanical structure which ascends/descends the tweeter speaker. Alternatively, an arbitrary force due to an unexpected abnormal situation.

Accordingly, when the tweeter speaker attempts to an ascend/descend operation, a motor which supplies a power to a tweeter speaker transfer unit for ascending/descending the tweeter speaker is overloaded due to the jamming force created by the object. If a pop-up or pop-down manipulation for the tweeter speaker is successively performed under these conditions, it could result in a malfunction of the pop-up tweeter speaker.

SUMMARY OF THE INVENTION

Various aspects of the present invention have been made in view of the above problems, and provide an apparatus, system and method for controlling stable driving of a pop-up tweeter speaker while electrically controlling pop-up/pop-down of the pop-up tweeter speaker installed in a vehicle when an ascending/descending operation of the pop-up tweeter speaker is not performed normally/correctly.

According to an aspect of the present invention, the system and method for controlling driving of a pop-up tweeter speaker is provided. In an exemplary embodiment of the present invention, the method initiates by (a) determining whether or not opening of the tweeter speaker has completed normally. If the operation/opening has not been performed correctly, the tweeter speak is controlled to pop-down. This determination is made while popping-up the tweeter speaker based on a speaker control condition under an ON condition of an accessory (ACC) condition. Then the system (b) determines whether or not closing of the tweeter speaker has been completed normally. If it has not closed normally, the system pops up the tweeter speaker. This determination is made when the tweeter speaker is popped down based on an OFF condition of either a speaker control condition or an ACC condition. The system then (c) maintains the position state of the tweeter speaker until the speaker control condition or the ACC condition becomes an OFF condition when popping-down the tweeter speaker in (a) or popping-up the tweeter speaker in (b).

The speaker control condition may an ON/OFF condition of any one of a speaker switch, an audio switch and/or an audio video navigation (AVN) switch.

For example, the tweeter speaker may not open correctly when (a) an open sensing signal for the tweeter speaker is not applied from an open sensing sensor within a preset time or when a current value detected from a tweeter speaker driving motor which supplies a power to a tweeter speaker transfer unit for ascending or descending the tweeter speaker exceeds a preset current value.

On the other hand, the tweeter speaker may not close correctly in (b) when a close sensing signal for the tweeter speaker is not applied from a close sensing sensor within a preset time or when a current value detected from the tweeter speaker driving motor which supplies the power to the tweeter speaker transfer unit for ascending or descending the tweeter speaker exceeds a preset current value.

According to an aspect of the present invention, an apparatus of controlling driving of a pop-up tweeter speaker is provided. The apparatus may include an open sensing sensor which is disposed in an upper part of a pop-up structure and is in contact so as to output an open sensing signal when the tweeter speaker is completely popped-up, a close sensing sensor which is disposed in a lower part of the pop-up structure and is in contact to output a close sensing signal when the tweeter speaker is completely popped-down, a tweeter speaker transfer unit which ascends the tweeter speaker to be popped-up or descends the tweeter speaker to be popped-down, a tweeter speaker driving motor which supplies power to the tweeter speaker transfer unit, a current detection unit which detects current generated during driving of the tweeter speaker driving motor, and a tweeter speaker driving control unit which outputs a control signal for controlling a pop-up state of the tweeter speaker to the tweeter speaker driving motor according to an accessory (ACC) condition and a speaker control condition and whether or not a pop-up or pop-down operation of the tweeter speaker has been performed normally The tweeter speaker driving control unit may be configured to determine whether or not the tweeter speakers open correctly during a popping-up operation of the tweeter speaker based on an ON condition of the speaker control condition under an ON condition of the ACC condition and pop-down the tweeter speaker if it is determined that the opening of the tweeter speaker has not normally completed; the tweeter speaker driving control unit may also be configured to determine whether or not the tweeter speaker has closed normally during a pop-down operation of the tweeter speaker based on an OFF condition of one of the speaker control condition and the ACC condition and pop-up the tweeter speaker if it is determined that the close of the tweeter speaker has not normally completed; and the tweeter speaker driving control unit may maintain a position state of the tweeter speaker until either a speaker control condition and/or the ACC condition becomes an OFF condition when popping-down the tweeter speaker or popping-up the tweeter speaker.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in more detail with reference to the accompany drawings.

Figure 1:
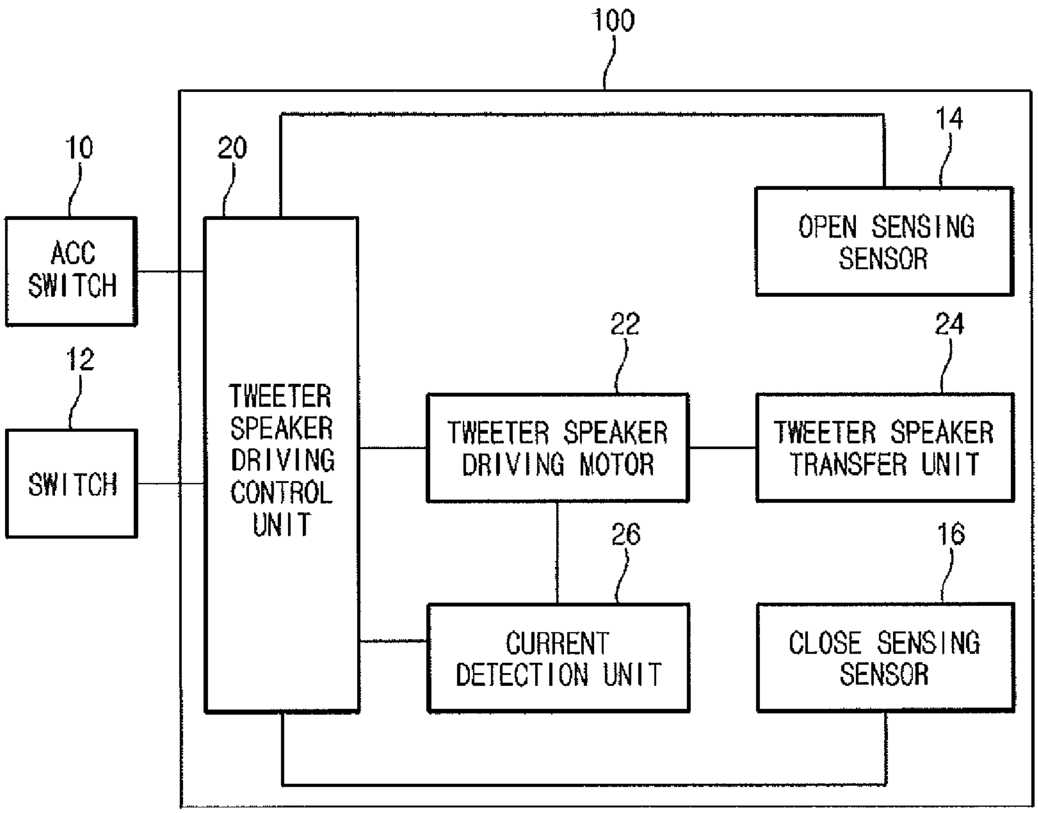
FIG. 1 is a schematic block diagram illustrating an exemplary apparatus of controlling driving of a pop-up tweeter speaker according to an exemplary embodiment of the present invention.

FIG. 1 is a schematic block diagram illustrating an apparatus for controlling driving of a pop-up tweeter speaker 100 according to an exemplary embodiment of the present invention. As shown in FIG. 1, the apparatus for controlling driving of a pop-up tweeter speaker 100 according to an exemplary embodiment of the present invention includes an open sensing sensor 14, a close sensing sensor 16, a tweeter speaker driving control unit 20, a tweeter speaker driving motor 22, a tweeter speaker transfer unit 24 and a current detection unit 26.

The switch 12 receives a pop-up or pop-down command of the tweeter speaker from a driver through an ON/OFF button installed in a predetermined portion of an inside of a vehicle. At this time, the switch may be implanted as a speaker switch, an audio switch and an audio video navigation (AVN) switch and the speaker switch may be installed on an AVN head unit. When the driver turns on the switch 12, the tweeter speaker always pops-up when an accessory on (ACC) power has been applied (if the tweeter speaker normally ascends). On the other hand, when the driver turns off the switch 12, the tweeter speaker maintains a pop-down state even when the ACC power has been applied (if the tweeter speaker normally descends).

The open sensing sensor 14 is disposed on an upper portion of a pop-up structure (not shown) of the tweeter speaker to sense when the tweeter speaker is completely popped-up and output an open sensing signal as a result of being in contact when the tweeter speaker is completely popped-up.

The close sensing sensor 16 is disposed in a lower portion of the pop-up structure (not shown) of the tweeter speaker to sense when the tweeter speaker is completely popped-down and outputs a close sensing signal by being in contact when the tweeter speaker is completely popped-down.

The tweeter speaker driving control unit 20 controls the pop-up state of the tweeter speaker based on the various states of an ACC switch 10 and the switch 12. In particular, in the exemplary embodiment of the present invention, the tweeter speaker driving control unit 20 makes the tweeter speaker return to an original state if a ascending/descending operation of the tweeter speaker is not normally performed while the tweeter speaker is popping-up or popping-down.

The tweeter speaker driving motor 22 supplies power to the tweeter speaker transfer unit 24 so that the tweeter speaker transfer unit 24 accordingly ascends or descends based on the control of the tweeter speaker driving control unit 20.

The tweeter speaker transfer unit 24 ascends the tweeter speaker to be popped-up or descends the tweeter speaker to be popped-down with the power/energy supplied from the tweeter speaker driving motor 22.

The current detection unit 26 detects a current flowing through the tweeter speaker driving motor 22 and provides a current detection signal corresponding to the detected current to the tweeter speaker driving control unit 20. The tweeter speaker driving control unit 20 determines whether or not the tweeter speaker is overloaded based on the current detection signal.

Figure 2:
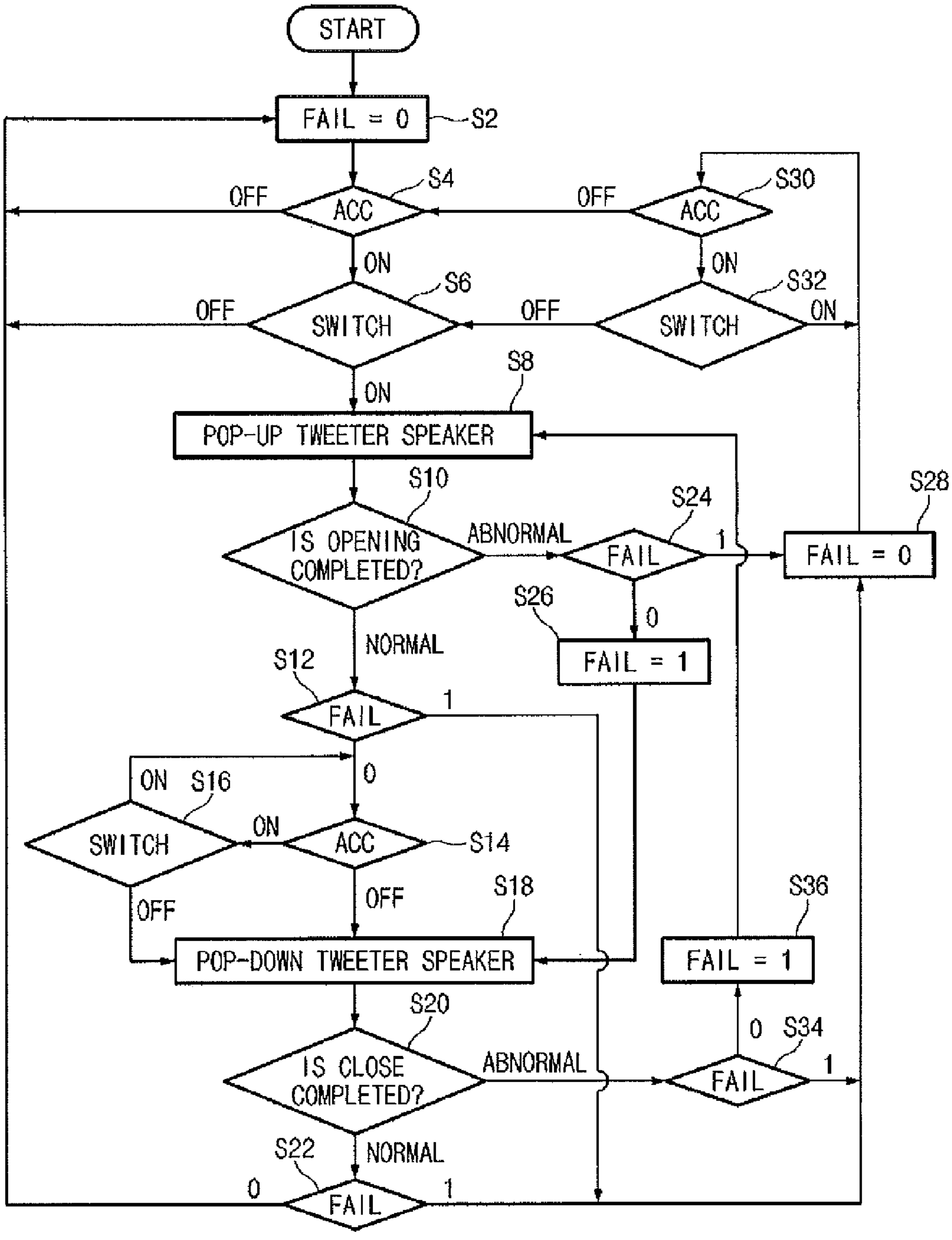
FIG. 2 is a flow chart illustrating an exemplary method of controlling driving of a pop-up tweeter speaker according to the exemplary embodiment of the present invention.

Hereinafter, a method of controlling driving a pop-up tweeter speaker according to an exemplary embodiment of the present invention will be described in more detail with reference to the accompanying flowchart as shown in FIG. 2.

The tweeter speaker driving control unit 20 sets a FAIL parameter to "0" (S2) and determines whether or not the ACC switch 10 is turned on (S4). If it is determined that the ACC switch 10 is turned on in S4, the tweeter speaker driving control unit 20 subsequently determines whether or not the switch 12 is turned on (S6).

If/when it is determined that the switch 12 is turned on in S6, the tweeter speaker driving control unit 20 applies a pop-up control signal to the tweeter speaker driving motor 22. The tweeter speaker driving motor 22 supplies power for an ascending operation to the tweeter speaker transfer unit 24 in response to the pop-up control signal, thereby popping-up the tweeter speaker (S8).

While the tweeter speaker is being popped-up, the tweeter speaker driving control unit 20 determines whether or not opening of tweeter speaker is completed normally/correctly based on a current detection signal from the current detection unit 26 and an open sensing signal from the open sensing sensor 14 (S10). In a determination process of S10, if a current value corresponding to the current detection signal does not exceed a preset reference current value and the open sensing signal is received within a predetermined time, the tweeter speaker driving control unit 20 determines that the opening has normally completed and checks a FAIL parameter (S12).

As a checking result in S12, if it is determined that the FAIL parameter is "0", the tweeter speaker driving control unit 20 checks an ON/OFF state of the ACC switch 10 and an ON/OFF state of the switch 12 to stand by until a pop-down command of the tweeter speaker (S14 and S16).

As checking results of S14 and S16, if it is determined that the ACC switch 10 is an OFF state or the switch 12 is an OFF state, the tweeter speaker driving control unit 20 applies a pop-down control signal to the tweeter speaker driving motor 22. The tweeter speaker driving motor 22 supplies power for a descending operation to the tweeter speaker transfer unit 24 in response to the pop-down control signal, thereby popping-down the tweeter speaker (S18).

While the tweeter speaker is being popped-down, the tweeter speaker driving control unit 20 determines whether or not close of the tweeter speaker is completed normally/correctly based on the current detection signal from the current detection unit 26 and a close sensing signal from the close sensing sensor 16 (S20). In a determination process of S20, if it is determined that a current value corresponding to the current detection signal does not exceed a preset reference current value and the close sensing signal is received within a predetermined time, the tweeter speaker driving control unit 20 determines that the close is normally completed and checks a FAIL parameter (S22).

In the above-described process, the FAIL parameter is maintained as "0" so that the tweeter speaker driving control unit 20 returns to an initial state and stands by until manipulation of the ACC switch 10 or the switch 12 by the driver.

On the other hand, differently from the above-described series of cases, in the process of popping-up the tweeter speaker by turning on the switch 12, if it is determined that the opening is not normally completed as the determination result of S10, the tweeter speaker driving control unit 20 checks the FAIL parameter (S24). As a checking result of S24, if it is determined that the "FAIL" parameter is "0", the tweeter speaker driving control unit 20 sets the FAIL parameter to "1" (S26) and then proceeds to S18. Thus, a pop-up operation of the tweeter speaker stops and it returns to a pop-down state (i.e., its original state).

As the determination result of S10, the case where the opening is not normally completed may be when the open sensing signal is not received from the open sensing sensor 14 within a preset time or when where the current value corresponding to the current detection signal from the current detection unit 26 is higher than the preset reference current value (that is, the case where the tweeter speaker driving motor 22 is overloaded).

In this case, if it is determined that the close is normally completed in S20 after the tweeter speaker driving control unit 20 applies the pop-down control signal to the tweeter speaker driving motor 22 in S18, the tweeter speaker driving control unit 20 proceeds to S22 and checks the FAIL parameter. Since the current FAIL parameter is "1", the tweeter speaker driving control unit 20 proceeds to S28 and initializes the FAIL parameter to "0".

After the tweeter speaker driving control unit 20 initializes the FAIL parameter to "0", it checks the ON/OFF state of the ACC switch 10 and the ON/OFF state of the switch 12 (S30 and S32). If it is determined that the ACC switch 10 is the OFF state as a checking result of S30, the tweeter speaker driving control unit 20 proceeds to S4, initializes a pop-up control of the tweeter speaker and performs the above-described S4 to S32. In addition, if it is determined that the switch 12 is the OFF state as a checking result of S32, the tweeter speaker driving control unit 20 proceeds to S6, initializes the pop-up control of the tweeter speaker and performs the above-described S6 to S32.

Next, an operation, when an operation is not normally performed in the state that the tweeter speaker is normally popped-up will be described below.

In the process of popping-down the tweeter speaker according to the control in S18, if it is determined that the close of the tweeter speaker is not normally performed in S20, the tweeter speaker driving control unit 20 checks the FAIL parameter (S34). If it is determined that the FAIL parameter is "0" (that is, in the case where the opening is normally completed in S10) as a checking result of S34, the tweeter speaker driving control unit 20 sets the FAIL parameter to "1" (S36) and proceeds to S8. Thereby, a pop-down operation of the tweeter speaker stops and the tweeter speaker returns to the pop-up state as the original state.

As the determination result of S20, the case where the close is not normally completed may be when the close sensing signal is not received from the close sensing sensor 16 within a preset time or when the current value corresponding to the current detection signal from the current detection unit 26 is higher than the preset reference current value (that is, the case where the tweeter speaker driving motor 22 is overloaded).

In this case, if it is determined that the opening is normally completed in S10 after the tweeter speaker driving control unit 20 applies the pop-up control signal to the tweeter speaker driving motor 22 in S8, the tweeter speaker driving control unit 20 proceeds to S12 and checks the FAIL parameter. Since the current FAIL parameter is "1", the tweeter speaker driving control unit 20 proceeds to S28 and changes the FAIL parameter to "0". Then, the tweeter speaker driving control unit 20 performs the above-described S30 to S32.

Next, an operation in the case where a pop-down operation is not normally performed in the state that the tweeter speaker is not normally popped-up will be described below.

When the close of the tweeter speaker is not normally performed as the determination result in S20, the tweeter speaker driving control unit 20 proceeds to S28 and changes the FAIL parameter to "0" if it is determined that the FAIL parameter is "1" in S34 (that is, since the opening is not normally completed in S10). Next, the tweeter speaker driving control unit 20 performs the above-described S30 to S32.

Subsequently, an operation in the case where a primary pop-up of the tweeter speaker is normally performed and a pop-down operation of the tweeter speaker is not normally performed so that though a secondary pop-up of the tweeter speaker is attempted, the secondary pop-up operation is not normally performed will be described below.

When it is determined that the opening of the tweeter speaker is not normally performed in S10, the tweeter speaker driving control unit 20 proceeds to S28 and changes/initializes the FAIL parameter to "0" if it is determined that the FAIL parameter is "1" in S24 (that is, since the close is not normally completed in S20). Then, the tweeter speaker driving control unit 20 performs the above-described S30 to S32.

Furthermore, the present invention may be embodied as computer readable media on a computer readable medium containing executable program instructions executed by a processor or a controller. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

As seen from the above-described processes, when an ascending operation is not normally performed in attempting the pop-up of the tweeter speaker, the tweeter speaker driving control unit 20 does not perform the pop-up of the tweeter speaker until the tweeter speaker is reset by the ACC switch 10 or the switch 12 while descending the tweeter speaker to the original position.

Even in contrast, when a descending operation is not normally performed in attempting the pop-down of the tweeter speaker, the tweeter speaker driving control unit 20 does not perform the pop-down of the tweeter speaker until the tweeter speaker is reset by the ACC switch 10 or the switch 12 while ascending the tweeter speaker to the original position.

According to the present invention, when the tweeter speaker is overloaded, or foreign substances are inserted into the tweeter speaker transfer unit 24 so that the tweeter speaker can not normally ascends or descends, such that the tweeter speaker is manipulated by force and the failure is caused can be excluded.

The present invention is effective in controlling stable driving of a pop-up tweeter speaker in electrically controlling pop-up or pop-down of the pop-up tweeter speaker installed in a vehicle when an ascending/descending operation is not normally performed in popping-up or popping-down the tweeter speaker.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling driving of a pop-up tweeter speaker, the method comprising:

(a) determining, by a processor, whether or not opening of the tweeter speaker is normally completed and popping-down the tweeter speaker in response to determining that the opening of the tweeter speaker is not normally completed, wherein the determining is performed while popping-up the tweeter speaker based on a speaker control condition under an ON condition of an accessory (ACC) condition;

(b) determining, by the processor, whether or not close of the tweeter speaker is normally completed and popping-up the tweeter speaker in response to determining that the tweeter speaker did not close normally, wherein the determining is performed while popping-down the tweeter speaker based on an OFF condition of one of the speaker control condition and the ACC condition; and (c) maintaining a position state of the tweeter speaker until the speaker control condition or the ACC condition becomes an OFF condition when popping-down the tweeter speaker in (a) or popping-up the tweeter speaker in (b), wherein the processor determines that the tweeter speaker has not opened normally in (a) when a current value detected from a tweeter speaker driving motor, which supplies a power to a tweeter speaker transfer unit for ascending or descending the tweeter speaker, exceeds a preset current value, and wherein the processor determines that the tweeter speaker has not closed normally in (b) when the current value detected from the tweeter speaker driving motor exceeds the preset current value.

2. The method according to claim 1, wherein the speaker control condition is an ON/OFF condition of any one of a group consisting of a speaker switch, an audio switch and an audio video navigation (AVN) switch.

3. The method according to claim 1, wherein the state that the opening of the tweeter speaker is not normally completed in (a) is when an open sensing signal for the tweeter speaker is not applied from an open sensing sensor within a preset time.

4. The method according to claim 3, wherein the state that the close of the tweeter speaker is not normally completed in (b) is when a close sensing signal for the tweeter speaker is not applied from a close sensing sensor within a preset time.

5. The method according to claim 1, the state that the close of the tweeter speaker is not normally completed in (b) is when a close sensing signal for the tweeter speaker is applied not from a close sensing sensor within a preset time or when a current value detected in a tweeter speaker driving motor which provide a power to a tweeter speaker transfer unit for ascending or descending the tweeter speaker exceeds a preset current value.

6. An apparatus of controlling driving of a pop-up tweeter speaker, the apparatus comprising:

an open sensing sensor which is disposed in an upper part of a pop-up structure and is in contact to output an open sensing signal when the tweeter speaker is completely popped-up;

a close sensing sensor which is disposed in a lower part of the pop-up structure and is in contact to output a close sensing signal when the tweeter speaker is completely popped-down;

a tweeter speaker transfer unit which ascends the tweeter speaker to be popped-up or descends the tweeter speaker to be popped-down;

a tweeter speaker driving motor which supplies power to the tweeter speaker transfer unit;

a current detection unit which detects a current generated during driving of the tweeter speaker driving motor; and a tweeter speaker driving control unit which outputs a control signal for controlling a pop-up state of the tweeter speaker to a tweeter speaker driving motor according to an accessory (ACC) condition and a speaker control condition and whether or not a pop-up or pop-down operation of the tweeter speaker is normally performed, wherein the tweeter speaker driving control unit determines that the tweeter speaker has not closed normally or that the tweeter speaker has not opened normally when a current value detected from the tweeter speaker driving motor exceeds a preset current value.

7. The apparatus according to claim 6, wherein the tweeter speaker driving control unit determines whether or not opening of the tweeter speaker is normally completed while popping-up the tweeter speaker based on an ON condition of the speaker control condition under an ON condition of the ACC condition and pops-down the tweeter speaker if it is determined that the opening is not normally completed as a determination result, wherein the tweeter speaker driving control unit determines whether or not close of the tweeter speaker is normally completed while popping-down the tweeter speaker based on an OFF condition of one of the speaker control condition and the ACC condition and pops-up the tweeter speaker if it is determined that the close is not normally completed as a determination result;

wherein the tweeter speaker driving control unit maintains a position state of the tweeter speaker until one of the speaker control condition and the ACC condition becomes an OFF condition when popping-down the tweeter speaker or popping-up the tweeter speaker.

8. The apparatus according to claim 7, wherein the tweeter speaker driving control unit determines that the close of the tweeter speaker is not normally completed in the case where the close sensing signal is not applied within a preset time from the close sensing sensor.

9. The apparatus according to claim 7, wherein the tweeter speaker driving control unit determines that opening of the tweeter speaker is not normally completed in the case where the open sensing signal is not applied within a preset time from the open sensing sensor.

10. The apparatus according to claim 7, wherein the speaker control condition is an ON/OFF condition of any one of a group consisting of a speaker switch, an audio switch and an audio video navigation (AVN) switch.

* * * * *